(12) United States Patent
Albizua Macua et al.

(10) Patent No.: US 11,976,628 B2
(45) Date of Patent: May 7, 2024

(54) DRIVETRAIN ASSEMBLY

(71) Applicant: Siemens Gamesa Renewable Energy Innovation & Technology S.L., Sarriguren (ES)

(72) Inventors: Juan Albizua Macua, Pamplona (ES); Mickaël Durand, Gorraiz (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 17/590,870

(22) Filed: Feb. 2, 2022

(65) Prior Publication Data
US 2022/0252049 A1 Aug. 11, 2022

(30) Foreign Application Priority Data
Feb. 11, 2021 (EP) .................................... 21382107

(51) Int. Cl.
*F03D 15/00* (2016.01)
*F03D 80/70* (2016.01)
*F16B 5/02* (2006.01)

(52) U.S. Cl.
CPC ............. *F03D 15/00* (2016.05); *F03D 80/70* (2016.05); *F16B 5/02* (2013.01); *F05B 2230/60* (2013.01);
(Continued)

(58) Field of Classification Search
CPC .......... F16C 35/04; F03D 15/00; F03D 80/70; F16B 5/02; F16B 2200/506;
(Continued)

(56) References Cited

U.S. PATENT DOCUMENTS 4,012,154 A * 3/1977 Durwin ................. F16C 35/063
403/370
4,316,678 A * 2/1982 F'Geppert ............... F16B 21/10
403/259
(Continued)

FOREIGN PATENT DOCUMENTS

WO WO 2011070984 A1 6/2011

OTHER PUBLICATIONS

European Search Report dated Jul. 8, 2021 for application No. 21382107.7.

*Primary Examiner* — Topaz L. Elliott
*Assistant Examiner* — Ryan C Clark
(74) *Attorney, Agent, or Firm* — Schmeiser, Olsen & Watts LLP

(57) ABSTRACT

Provided is a drivetrain assembly including a rotor shaft; a bearing unit mounted about the rotor shaft; and a further drivetrain component connected to an end of the rotor shaft, wherein an annular face of the further drivetrain component is arranged opposite an annular face of the bearing unit with a distance between the annular faces. The drivetrain assembly is characterized by an annular arrangement of tapped holes formed in a first of the two opposing annular faces; a plurality of bolts, wherein each bolt includes a bolt shaft threaded into a tapped hole, a lock nut threaded onto the bolt shaft and tightened against the first annular face; and a bolt head arranged to make contact with the second of the two opposing annular faces. Also provided is a wind turbine including a such a drivetrain assembly; and a method of assembling such a drivetrain.

15 Claims, 6 Drawing Sheets

(52) U.S. Cl.
CPC ..... *F05B 2240/50* (2013.01); *F05B 2260/301* (2013.01); *F05B 2260/4031* (2013.01)

(58) Field of Classification Search
CPC .............. F05B 2230/60; F05B 2240/50; F05B 2260/301; F05B 2260/4031
See application file for complete search history.

(56) References Cited

U.S. PATENT DOCUMENTS

| | | | | |
|---|---|---|---|---|
| 5,153,990 | A * | 10/1992 | Martinie | F16D 1/095 29/898.07 |
| 8,961,025 | B1 * | 2/2015 | Kobayashi | F16D 1/095 384/538 |
| 9,284,949 | B2 * | 3/2016 | Pick | F03D 80/70 |
| 10,502,195 | B2 * | 12/2019 | Thomas | F16C 43/04 |
| 2010/0009799 | A1 * | 1/2010 | Ciszak | F16C 35/06 475/159 |
| 2010/0026005 | A1 * | 2/2010 | Nitzpon | F03D 80/70 290/55 |
| 2011/0110769 | A1 * | 5/2011 | Stiesdal | F16C 35/062 29/889.1 |
| 2012/0112463 | A1 | 5/2012 | Gelmini | |
| 2012/0192391 | A1 | 8/2012 | Tobinaga | |
| 2013/0237370 | A1 * | 9/2013 | Smith | F03D 15/00 475/348 |
| 2015/0030277 | A1 * | 1/2015 | Pick | F16C 19/38 384/558 |
| 2016/0090966 | A1 * | 3/2016 | Kullin | F03D 1/06 416/174 |
| 2016/0265577 | A1 * | 9/2016 | Kirchen | F16B 19/02 |
| 2018/0057904 | A1 * | 3/2018 | Qi | C22C 38/44 |
| 2019/0063400 | A1 * | 2/2019 | Gomez | F03D 80/50 |
| 2020/0173471 | A1 * | 6/2020 | Voss | F16B 5/025 |
| 2020/0300300 | A1 * | 9/2020 | Heuser | F16C 33/605 |
| 2021/0003117 | A1 * | 1/2021 | Nies | F16C 17/10 |
| 2021/0215184 | A1 * | 7/2021 | Moore | H02K 7/1838 |

* cited by examiner

DRIVETRAIN ASSEMBLY

CROSS-REFERENCE TO RELATED APPLICATIONS

This application claims priority to EP Application No. 21382107.7, having a filing date of Feb. 11, 2021, the entire contents of which are hereby incorporated by reference.

FIELD OF TECHNOLOGY

The following relates to a drivetrain assembly, a wind turbine comprising such a drivetrain assembly, and a method of assembling such a drivetrain.

BACKGROUND

The drivetrain of a wind turbine comprises an aerodynamic rotor with rotor blades that convert wind energy into a rotating motion of a hub and rotor shaft. The rotating shaft turns the rotor of an electrical machine so that electricity is generated.

A large bearing is required between the rotor shaft and the stationary supporting structure. The inner race of the bearing is generally connected to the rotating shaft by a press fit, also referred to as a friction fit or interference fit. During operation of the wind turbine, the bearing is subject to very large axial loads, particularly in the "downstream" direction. To prevent damage to the bearing, the rotating shaft and the other drivetrain components, it is crucial that axial displacement of the bearing assembly is prevented.

One way of doing this is to close any gap between the bearing assembly and the next immovable component, for example to close the gap between the bearing assembly and a gearbox. This can be done in a number of ways. In one approach, a tight-fitting ring is placed about the shaft between the bearing assembly and a gearbox. The width of the ring is the same as the width of the gap between the bearing assembly and the gearbox, so that it can prevent the bearing assembly from displacement in the "downstream" direction, i.e., towards the gearbox. However, it can be difficult to mount such a form-fit ring if its inner diameter is even only slightly smaller than intended. In another approach, the rotating shaft is machined to have an outer thread, and the ring is machined to have a matching inner thread. The ring is then threaded onto the shaft. In this case also, the width of the ring is the same as the width of the gap between the bearing assembly and the gearbox. While the threaded ring can be easier to mount than the form-fit ring, manufacturing costs are significantly higher.

SUMMARY

An aspect relates to a more economical way of axially fixing the position of a bearing assembly on a rotating shaft.

According to embodiments of the invention, the drivetrain assembly comprises a rotor shaft; a bearing unit mounted about the rotor shaft; and a further drivetrain component connected to an end of the rotor shaft, wherein an annular face of the further drivetrain component is arranged opposite an annular face of the bearing unit with an essentially uniform distance between the annular faces. The inventive drivetrain assembly is characterized by load transfer bridge comprising an annular arrangement of bolts that prevents axial displacement of the bearing unit during operation of the drivetrain. To this end, the inventive drivetrain assembly comprises an annular arrangement of axial tapped holes formed in one of the opposing annular faces. Each of the plurality of bolts comprises a threaded bolt shaft which is inserted over a portion of its length into a tapped hole. Each bolt carries a lock nut which is tightened against the annular face that contains the tapped holes. The bolt head of each bolt is arranged to make contact with the other annular face.

The term "axial" is to be understood to relate to the axis of the drivetrain shaft, so that the expression "axial tapped hole" means that the tapped hole extends in the same direction as the rotation axis of the drivetrain shaft, i.e., a tapped hole is parallel to the surface of the drivetrain shaft. It follows that the longitudinal axis of a bolt is also essentially parallel to the rotation axis.

An advantage of the inventive drivetrain assembly is that axial displacement of the bearing unit can be prevented in a favorably economical manner. There is no need to provide an expensive precision-machined ring. Instead, embodiments of the invention can be realized with readily available threaded bolts and lock nuts, and the formation of tapped or threaded holes is also easily done. A bolt that is threaded into a tapped hole may be referred to as a machine screw. Such fasteners are readily available in a wide range of standard sizes, and corresponding tools for forming tapped holes are also readily available.

Because the bolts are securely anchored at one end (e.g., in tapped holes formed in the bearing unit) and the bolt heads are in physical contact with the other annular face (e.g., a face of the further drivetrain component), axial forces acting on the bearing unit are effectively transferred between the opposing faces, so that the position of the bearing unit will remain fixed during operation of the drivetrain. The bolts therefore act as a "load transfer bridge" between the bearing unit and the further drivetrain component. It shall be understood in the following that the bolts extend between components that rotate as one with the rotor shaft during operation of the drivetrain.

The inventive wind turbine comprises an embodiment of such a drivetrain assembly. The overall production cost of such a wind turbine can be favorably reduced since there is no need to provide an expensive machined ring to inhibit axial displacement of the bearing unit, and assembly of the drivetrain is more straightforward.

According to embodiments of the invention, such a drivetrain is assembled or manufactured as follows: a bearing unit is mounted about a rotor shaft, and a further drivetrain component is mounted to the non-drive end of the rotor shaft, such that an annular face of the further drivetrain component is at a distance from an opposing annular face of the bearing unit. The inventive method is characterized by a prior step of forming an annular arrangement of tapped holes in the first annular face, and providing a corresponding number of threaded bolts or machine screws. A lock nut is threaded onto each bolt shaft, and each bolt is threaded into one of the tapped holes. These steps are performed prior to mounting the further drivetrain component to the rotor shaft. The exposed lengths of the bolts can be adjusted at this stage to be less than the distance between the opposing annular faces. After mounting the further drivetrain component to the rotor shaft, the bolts are turned so that each bolt head lies against the second annular face. The lock nuts are then tightened against the first annular face.

An advantage of the inventive method is the low cost of providing the tapped holes and the fasteners; another advantage is the effectiveness of the load transfer bridge formed by the bolts extending between the bearing unit and the other drivetrain component.

Embodiments and features of the invention are given by the dependent claims, as revealed in the following description. Features of different claim categories may be combined as appropriate to give further embodiments not described herein.

In the following, it may be assumed that the drivetrain assembly is part of a wind turbine, i.e., the rotor shaft is turned by the aerodynamic rotor (rotor blades and hub). In the following, without restricting embodiments of the invention in any way, it may be assumed that such a wind turbine is realized as geared wind turbine, and that the further drivetrain component is a rotating component of the gearbox unit. A step of turning the bolts and/or the step of tightening the lock nuts can be performed after installation of the drivetrain in the nacelle of the wind turbine.

The rotor shaft of a drivetrain or power train may be regarded as having a "drive end" and a "non-drive end". In the case of a wind turbine, the drive end is turned by the aerodynamic rotor. In a geared wind turbine, the non-drive end of the rotor shaft is connected to the gearbox unit. In the following, the terms "upwind" and "upstream" may be used when referring to the drive end direction, while the terms "downwind" and "downstream" may be used to when referring to the non-drive end direction.

While the tapped holes can be formed in either the bearing unit or the further drivetrain component, for the sake of simplicity it shall be assumed in the following that the tapped holes are formed in the bearing unit and that the bolt heads will make contact with an annular face of the further drivetrain component. Furthermore, it shall be assumed that the tapped holes are formed in a rotating housing part of the bearing unit, and that the bolt heads will make contact with an annular face of a rotating gearbox flange. In an embodiment, the tapped holes are equidistantly spaced about the rotating housing part of the bearing unit.

The term "fully extended bolt" is used herein to refer to a bolt that has been turned so that its bolt head is pressed against the gearbox flange, and whose lock nut has been tightened against the rotating housing part of the bearing unit.

The depth of the tapped holes will depend on the material thickness of the bearing unit housing. The length of a bolt comprises the gap width (between opposing faces of bearing unit and gearbox flange) plus a large fraction of the tapped hole depth, instead of the entire depth, in order to facilitate assembly of the drivetrain. For example, the bolt length can comprise the gap length plus 90% of the tapped hole depth.

In an embodiment, during the final assembly stage of the drivetrain, each bolt head is turned—for example using a torque wrench—so that its outer surface is firmly pressed against the annular face of the gearbox flange. The contact area between bolt heads and annular face can be optimized by using an appropriately large number of bolts and/or by selecting bolts with favorably large bolt heads.

In an embodiment of the invention, the rotor shaft is formed to include an outer annular ridge upwind of the bearing unit to prevent axial displacement of the bearing unit in the upstream direction during operation of the drivetrain.

In a 5 MW wind turbine for example, the inner diameter of the bearing unit can be in the order of 900 mm-1300 mm. For such a wind turbine with an embodiment of the inventive drivetrain assembly, the load transfer bridge comprises 10-16 bolts in an annular arrangement bridging the gap between bearing unit and gearbox flange.

BRIEF DESCRIPTION

Some of the embodiments will be described in detail, with reference to the following figures, wherein like designations denote like members, wherein.

DETAILED DESCRIPTION

Figure 1:
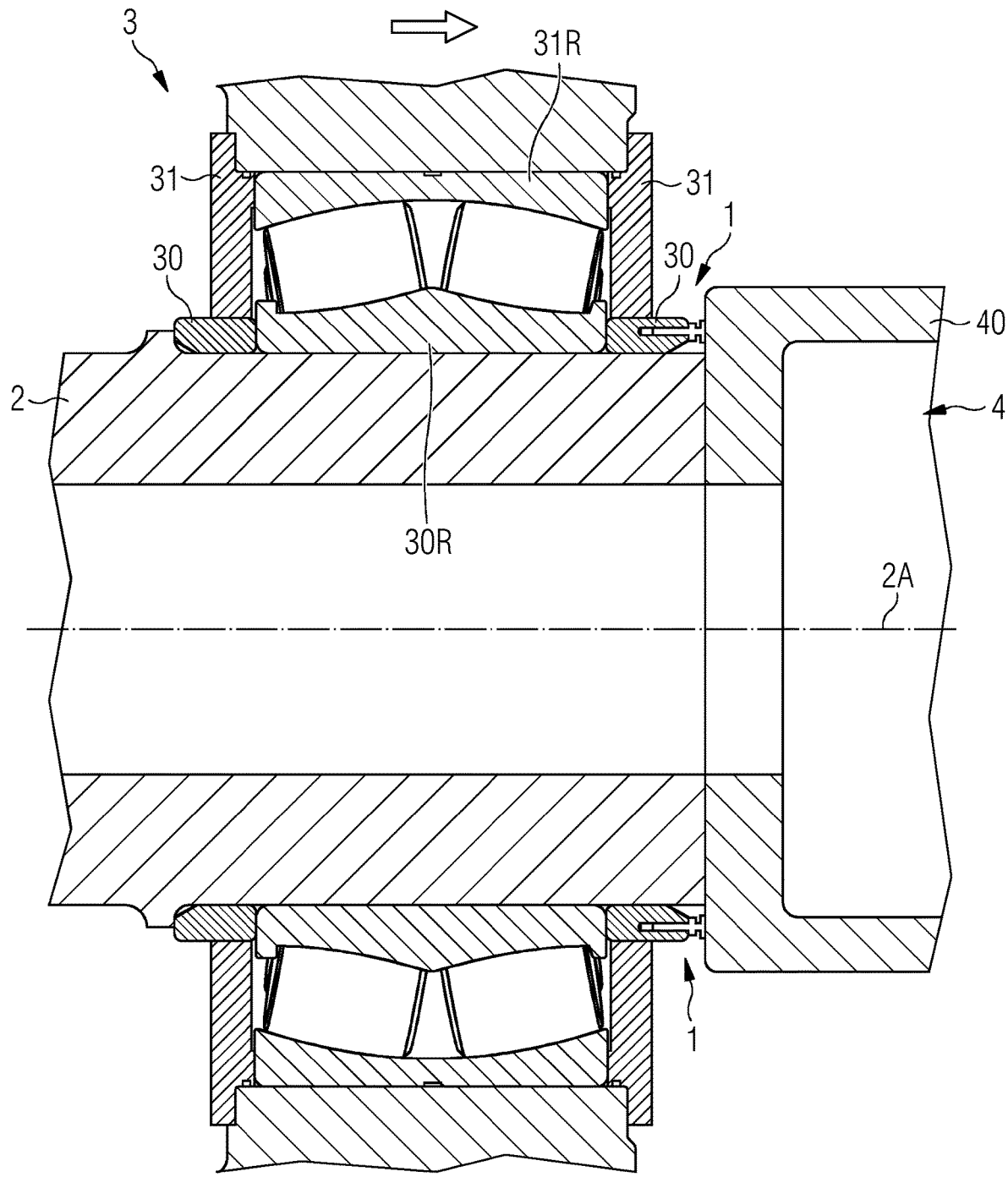
FIG. 1 shows an embodiment of a drivetrain assembly.

FIG. 1 shows a cross-section through a relevant region of a wind turbine drivetrain, showing details at the junction between the rotor shaft 2 and a gearbox unit 4. The gearbox unit 4 is mounted by bolts (not shown) to the rotor shaft 2. The diagram shows a bearing unit 3 in place about the shaft 2. The bearing unit 3 comprises a stationary outer ring 31R and outer housing part 31, and a rotating inner ring 30R and inner housing part 30. In this exemplary embodiment, the bearing unit 3 is constructed as a double-row spherical roller bearing.

An interference fit between the bearing unit 3 and rotor shaft 2 ensures that the inner ring 30R and inner housing part 30 move as one with the rotating shaft 2. The stationary outer housing part 31 of the bearing unit 3 can be connected to another stationary part, for example to a bedframe or to the nacelle, for example.

During operation of the wind turbine, the bearing unit 3 is subject to various types of load and care must be taken to prevent axial displacement. The diagram shows an annular protrusion at the upwind side of the bearing unit 3, which serves to prevent axial displacement of the bearing unit in the upwind direction. However, the significant forces acting on the bearing unit 3 are mostly in the downwind direction (indicated by the arrow pointing to the right). Displacement of the bearing unit 3 is prevented by the inventive drivetrain assembly as shown here. A load transfer bridge 1 is provided in the form of an annular arrangement of bolts 11 extending into tapped holes 10 formed in the inner housing 30 of the bearing unit 3 at the downwind side. The bolts 11 are threaded along their length, and each bolt 11 carries a lock nut 12. The bolt heads 11H are pressed against an annular face 40F of a gearbox flange 40 of the gearbox unit 4.

Figure 2:
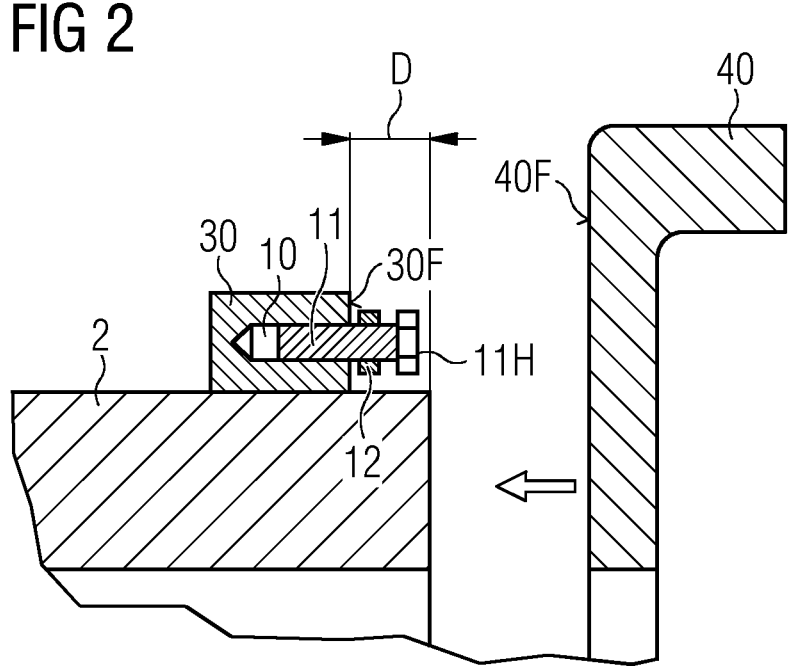
FIG. 2 shows a more detailed view of a load transfer bridge of FIG. 1.

The position of each bolt 11 is fixed during an installation procedure as follows: after arranging the bearing unit 3 in place on the rotor shaft 2, as illustrated in FIG. 2, the bolts 11 (each carrying a lock nut 12) are threaded into the tapped holes 10 so that the exposed bolt lengths are shorter than the gap D between bearing unit 3 and (not yet mounted) gearbox flange 40. Each bolt 11 is turned into its tapped hole 10 in order to not interfere with the subsequent step of mounting the gearbox flange.

The length of a bolt 11 can be determined by the distance D to be bridged between the opposing faces 30F, 40F, plus 80%-90% of the depth of its tapped hole 10.

Figure 3:
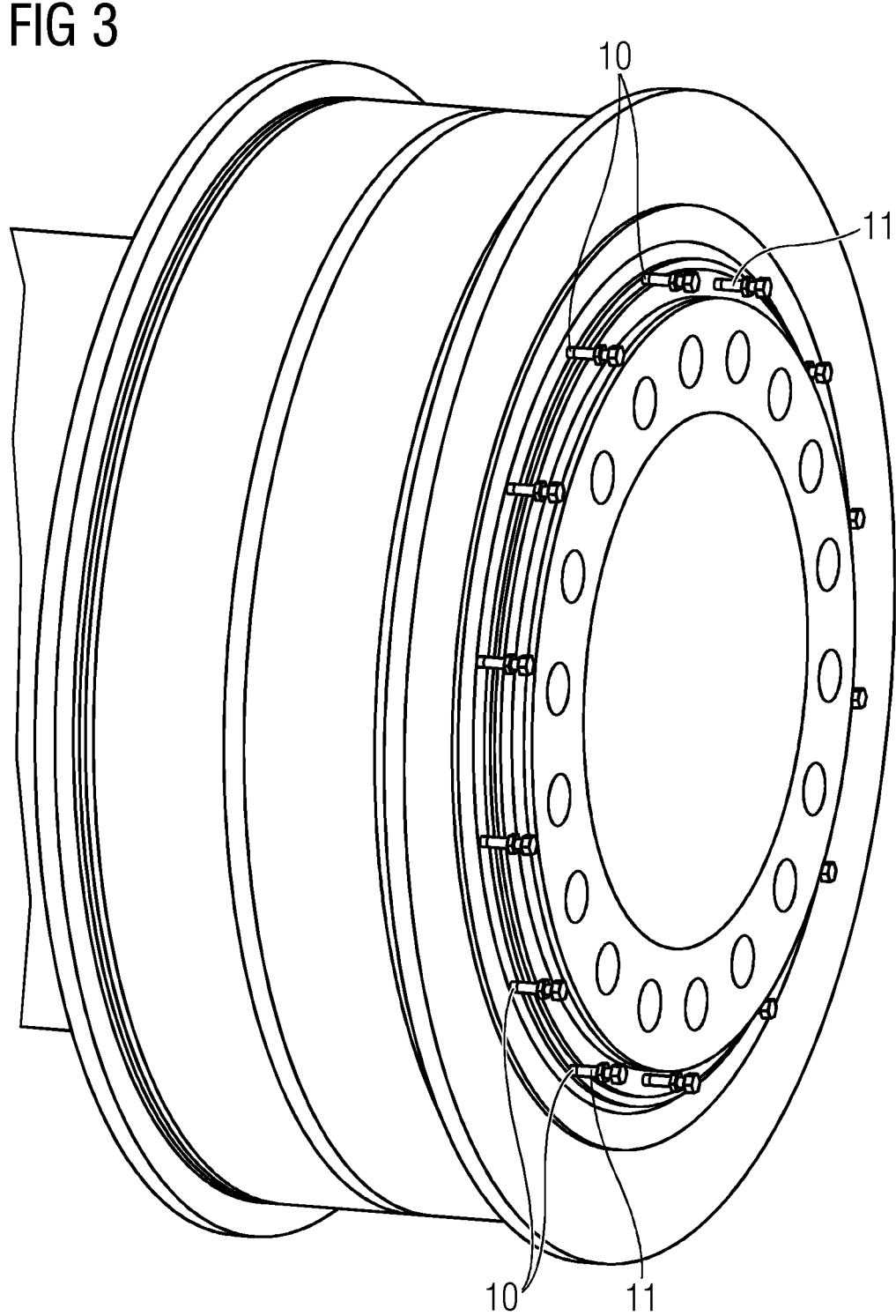
FIG. 3 illustrates a stage during an assembly of the drivetrain of FIG. 1.

FIG. 3 shows a perspective view of this partial assembly, with fourteen such bolts 11 positioned for insertion into fourteen tapped holes 10 equally spaced about the bearing housing 30.

Figure 4:
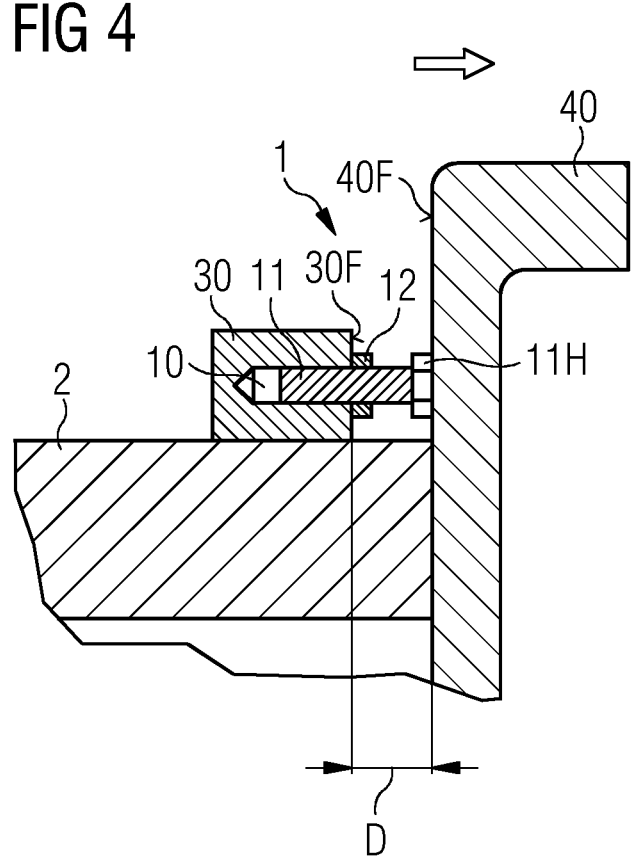
FIG. 4 illustrates a further stage during the assembly of the drivetrain of FIG. 1.

The gearbox unit is then installed by connecting the gearbox flange 40 to the non-drive end of the rotor shaft 2. Once the gearbox flange 40 is connected to the rotor shaft 2, each bolt 11 is turned until its head 11H lies against the gearbox flange surface 40F. The bolts 11 can be turned to a torque of several Nm to actively press the bolt heads 11H against the flange surface 40F. The lock nuts 12 are then turned to tighten them against the surface 30F of the bearing housing 30. This stage is illustrated in FIG. 4. With the bolts 11 configured thus, a load transfer bridge 1 is formed to prevent axial displacement of the bearing unit 3 in the downwind direction (indicated by the arrow pointing to the right).

During a maintenance procedure, the bolts 11 and lock nuts 12 can be turned (loosened or tightened) as appropriate to compensate for any alteration in the gap between bearing unit 3 and gearbox flange 40.

Figure 5:
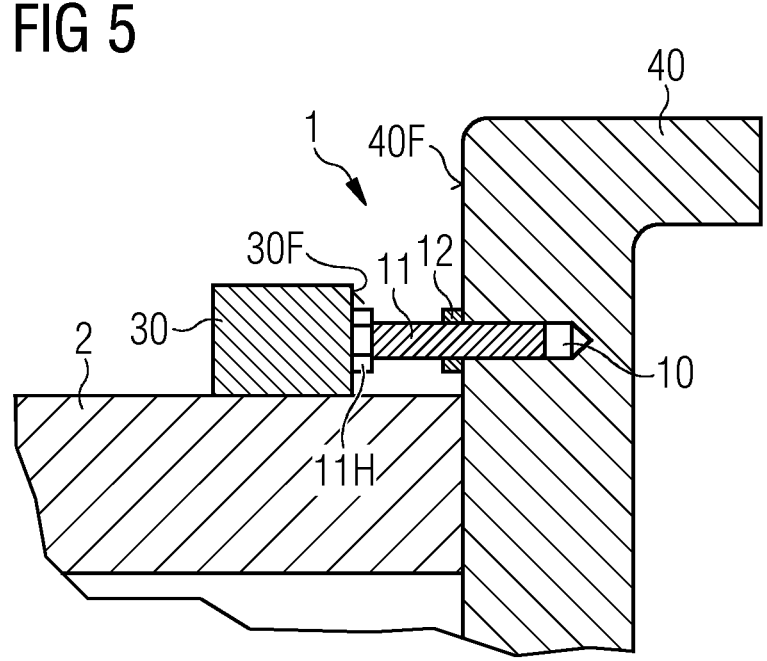
FIG. 5 shows an alternative embodiment of the drivetrain assembly.

FIG. 5 shows an alternative embodiment of the inventive load transfer bridge 1, with the tapped holes 10 formed in the gearbox flange 40, and the bolt heads 11H lying against the annular face 30F of the inner bearing housing part 30.

Figure 6:
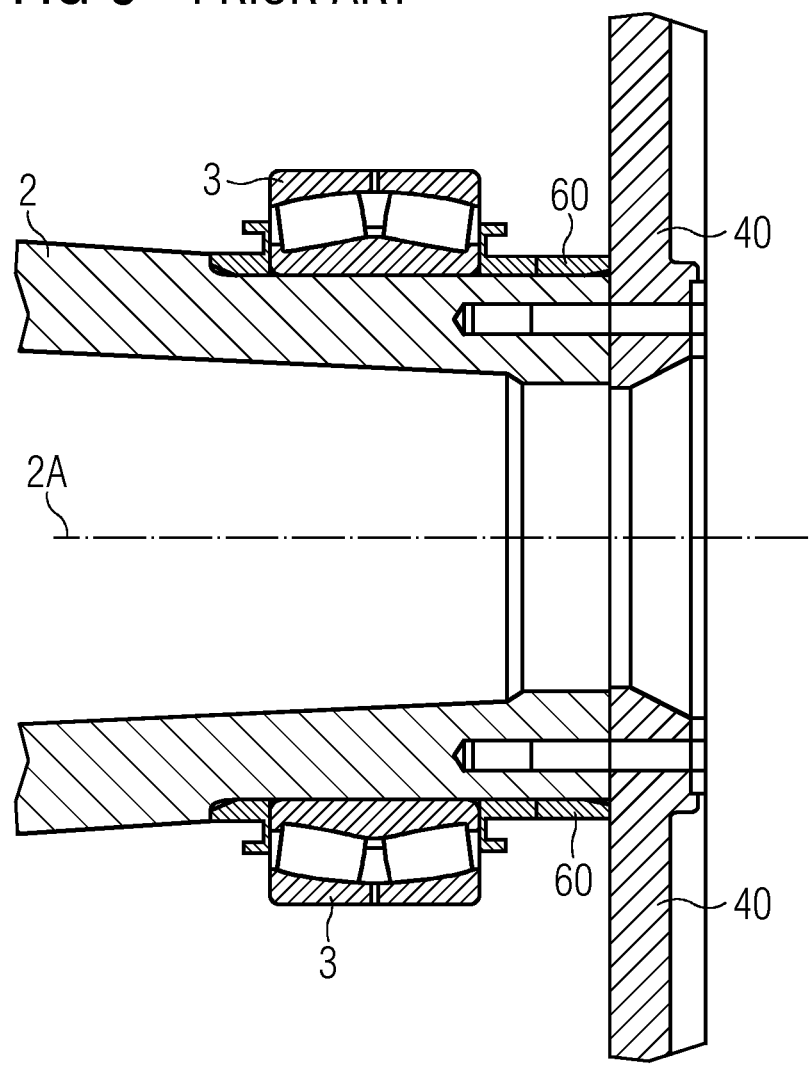
FIG. 6 shows a prior art drivetrain assembly.
Figure 7:
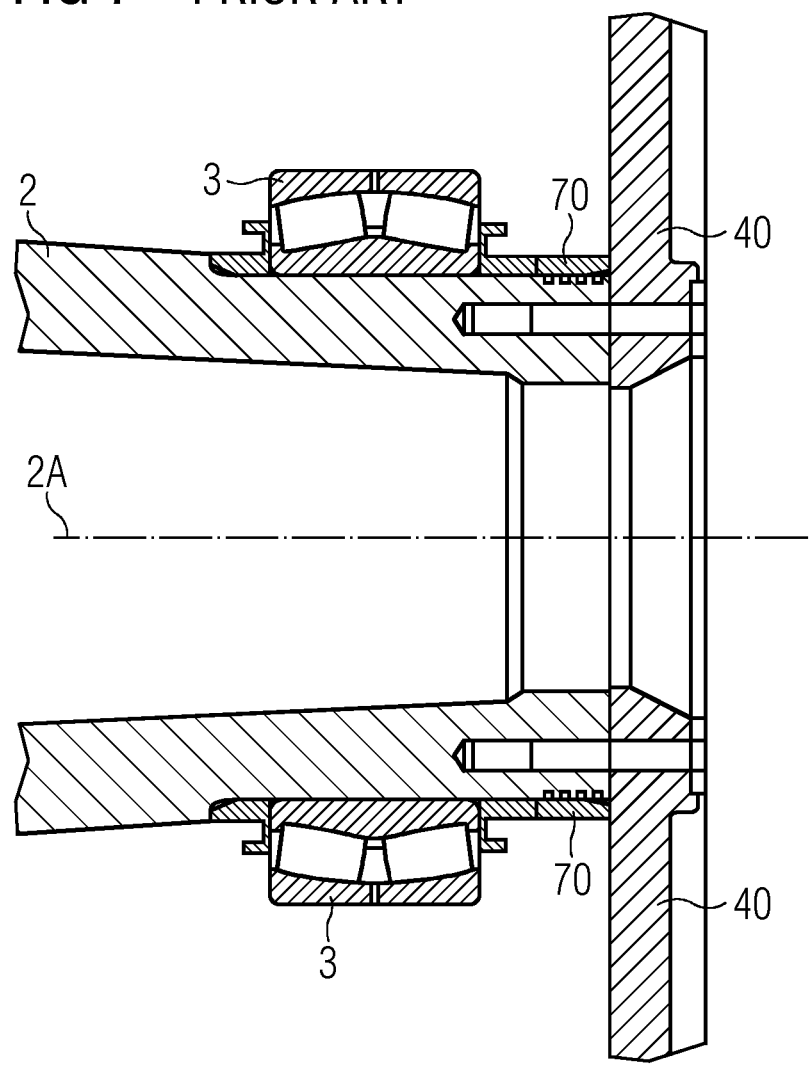
FIG. 7 shows a further prior art drivetrain assembly.

FIG. 6 and FIG. 7 each show a prior art approach to preventing axial displacement of a bearing assembly. Similar to the construction explained in FIGS. 1-5 above, the diagram shows a rotor shaft 2 of a wind turbine with a bearing unit 3 in place. In FIG. 6, axial displacement of the bearing unit 3 is prevented by a form-fit ring 60 arranged about the rotor shaft 2. Because the inner diameter of the ring 60 should ideally be the same as the outer diameter of the shaft 2, it can be very difficult to mount the thin ring 60 onto the large rotor shaft 2. In FIG. 7, axial displacement of the bearing unit 3 is prevented by a threaded ring 70 arranged about the rotor shaft 2. The large outer thread of the rotor shaft 2 and the large inner thread of the ring 70 must be machined to a high degree of precision, requiring expensive tools and adding significantly to the overall costs.

Although the present invention has been disclosed in the form of preferred embodiments and variations thereon, it will be understood that numerous additional modifications and variations could be made thereto without departing from the scope of the invention. For example, although the invention has been described using the example of a wind turbine drivetrain, the load transfer bridge formed by the bolts and tapped holes can be implemented in other kinds of drivetrain in which axial displacement of a bearing unit is to be prevented.

For the sake of clarity, it is to be understood that the use of "a" or "an" throughout this application does not exclude a plurality, and "comprising" does not exclude other steps or elements.

The invention claimed is:

1. A drivetrain assembly comprising:
   a rotor shaft;
   a bearing unit mounted about the rotor shaft;
      a further drivetrain component connected to an end of the rotor shaft, wherein an annular face of the further drivetrain component is arranged opposite an annular face of the bearing unit with a distance between the annular faces;
   an annular arrangement of tapped holes formed in a first annular face of the two opposing annular faces; and
   a plurality of bolts, wherein each bolt comprises a bolt shaft threaded into a tapped hole, a lock nut threaded onto the bolt shaft and tightened against the first annular face, and a bolt head arranged to make contact with a second annular face of the two opposing annular faces.

2. The drivetrain assembly according to claim 1, wherein a bolt head is pressed against the second annular face.

3. The drivetrain assembly according to claim 1, wherein a bolt head comprises a flat surface that is parallel to the second annular face.

4. The drivetrain assembly according to claim 1, wherein the longitudinal axis of each tapped hole is parallel to a rotation axis of the drivetrain assembly.

5. The drivetrain assembly according to claim 1, wherein the tapped holes are formed in an inner housing part of the bearing unit.

6. The drivetrain assembly according to claim 1, wherein the length of a bolt is a sum of the distance between the annular faces and a fraction of a depth of a tapped hole.

7. The drivetrain assembly according to claim 1, wherein the tapped holes are equidistantly spaced.

8. The drivetrain assembly according to claim 1, wherein the rotor shaft comprises a means to prevent axial displacement of the bearing unit towards a drive end of the rotor shaft.

9. A wind turbine comprising the drivetrain assembly according to claim 1.

10. The wind turbine according to claim 9, wherein the wind turbine is a geared wind turbine.

11. The wind turbine according to claim 10, wherein the annular arrangement of bolts extends between a bearing unit and a flange of a gearbox unit.

12. The wind turbine according to claim 9, wherein an inner diameter of the bearing unit is at least 200 mm.

13. The wind turbine according to claim 9, further comprising an annular arrangement of at least four tapped holes, or at least 8 tapped holes, in the first annular face.

14. A method of assembling a drivetrain assembly, the method comprising:
   mounting a bearing unit about a rotor shaft; and
   connecting a further drivetrain component to the rotor shaft such that an annular face of the further drivetrain component is at a distance from an opposing annular face of the bearing unit;
   further comprising
   a prior step of forming an annular arrangement of tapped holes in the first annular face;
   providing a plurality of bolts, wherein each bolt comprises a bolt shaft and a bolt head;
   threading a lock nut onto each bolt shaft;
   turning each bolt in a tapped hole to press the bolt head of that bolt against the second annular face; and
   tightening each lock nut against the second annular face.

15. The method according to claim 14, wherein the drivetrain is a wind turbine drivetrain, and wherein the step of turning the bolts and/or the step of tightening the lock nuts is performed after installation of the drivetrain in a nacelle of a wind turbine.

* * * * *